Patented Sept. 8, 1931

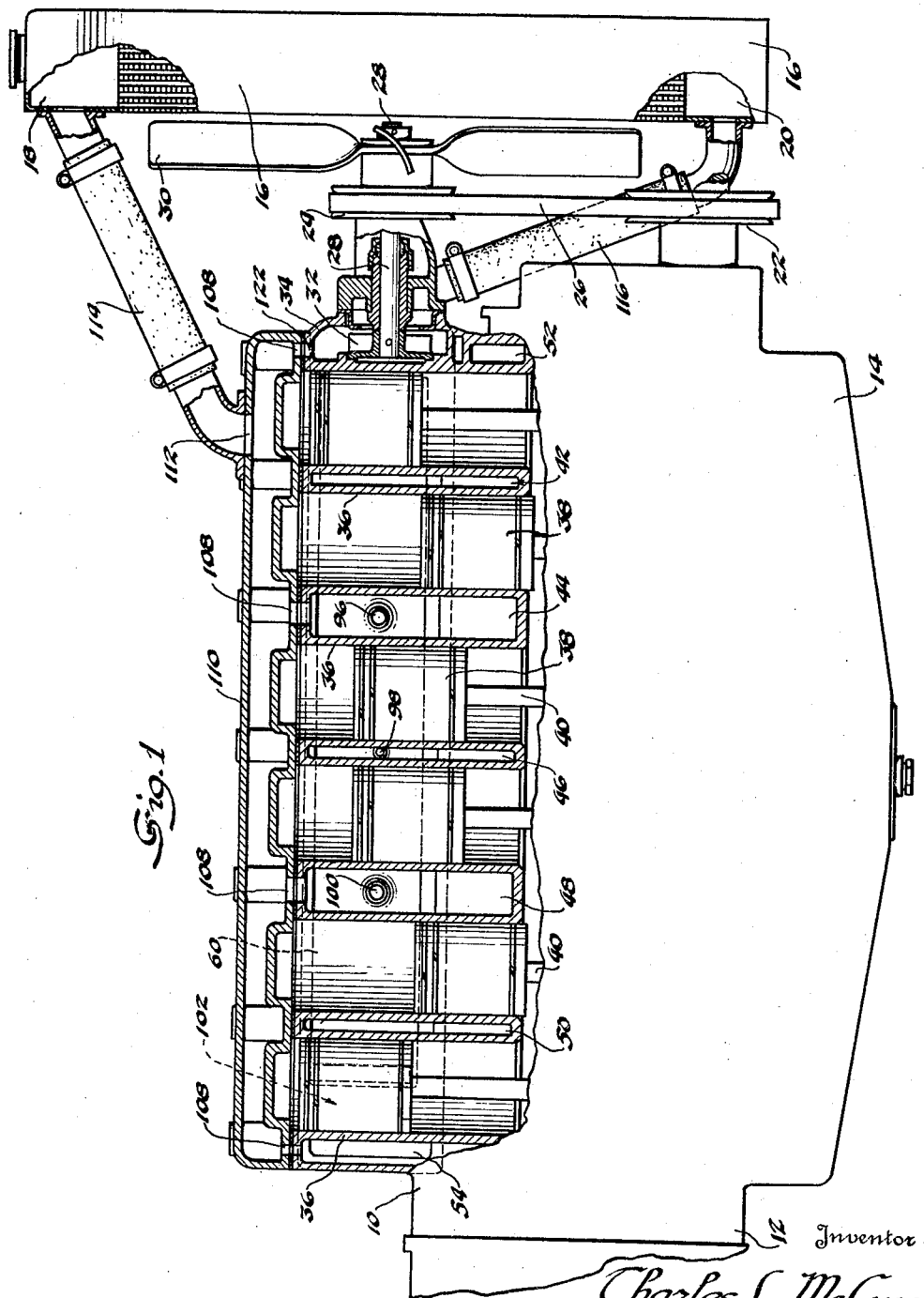

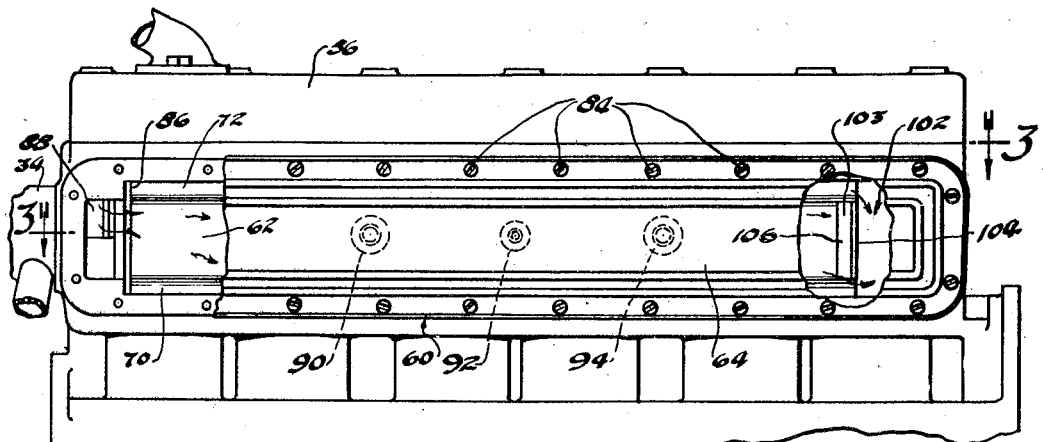
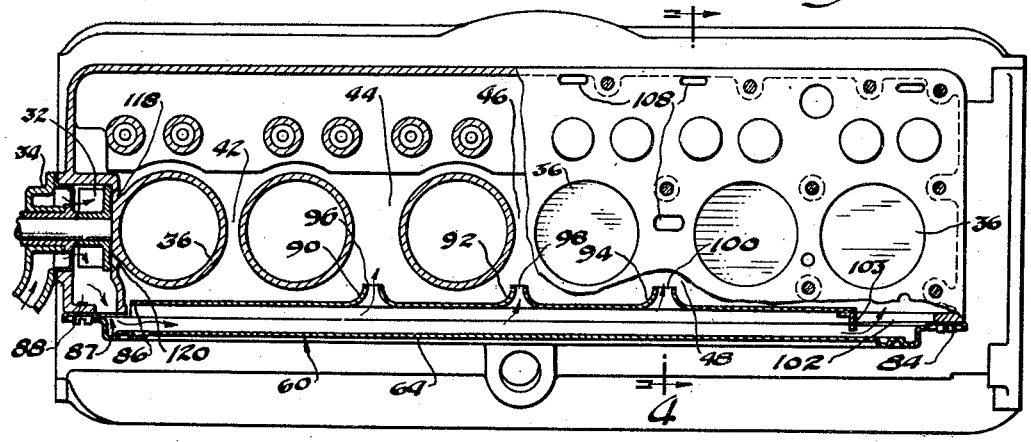
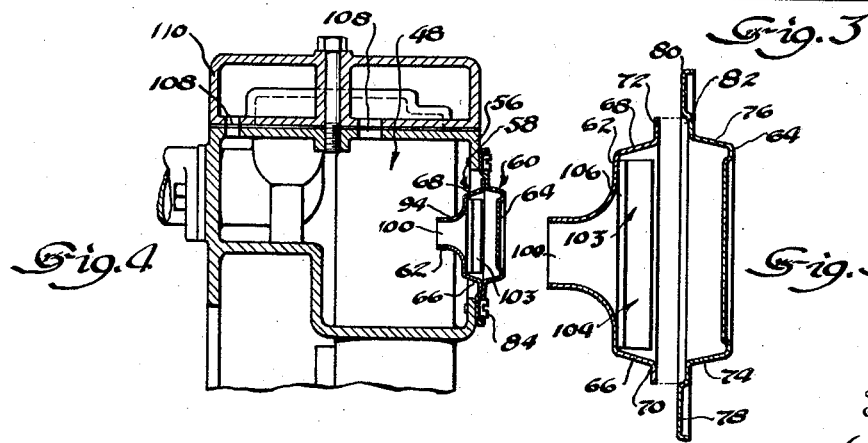

1,822,857

UNITED STATES PATENT OFFICE

CHARLES L. McCUEN, OF LANSING, MICHIGAN, ASSIGNOR TO GENERAL MOTORS CORPORATION, OF DETROIT, MICHIGAN, A CORPORATION OF DELAWARE

WATER CIRCULATING SYSTEM

Application filed June 8, 1928. Serial No. 283,901.

This invention relates to water circulating systems, and has particular reference to systems as applied to internal combustion engines used on automotive vehicles.

It is the object of the invention to provide a cooling system which will give a more equal distribution of the water, and a consequent more even cooling of the heated parts of the internal combustion engine.

The object of the invention is accomplished by forming at one end of the cylinder block, a housing which contains the usual water pump used for forcing the water through the system. In the side of the cylinder block opposite the valve chamber, I provide a separate manifold which extends substantially the full length of the engine block. The manifold is formed of two members, U shaped in cross-section and provided with flanges at the legs of the U. These two parts are united at their flanged portions, and have the base of each U projection in opposite directions so as form a channel therebetween. The inner member extends short of both ends of the outer member to provide an inlet port at one end, which port is connected with a passage leading to the water pump. At the opposite end, due to the shortness of the inner member, an exit opening for the water is provided. This exit opening allows for the flow of water to the cylinders at the end of the engine farthest away from the pump. In order to prevent a too rapid flow of water from this relatively large opening, a baffle in the form of an angle plate is provided at the end of the inner member, which baffle extends across the passage in the manifold and will restrict the flow of water therefrom.

Along the manifold intermediate its length is a plurality of openings which permit a suitable amount of water to pass from the manifold between the cylinders. Inasmuch as the spacing between the cylinders varies, the size of the openings will vary so as to permit the larger amount of water to flow into the larger spaces or the ones where a greater degree of cooling is required. These openings are preferably at the ends of pressed out projecting portions formed integral with the inner member.

The manifold is preferably attached to the engine block by the laterally extending flange on the outer U-shaped member, the flanges of the inner member being relatively shorter and fitting within a rabbet formed on the outer member.

Referring to the drawings:

Figure 1 shows a view of an internal combustion engine with parts shown in section to show the water passages, the view being taken from the engine side opposite that on which the manifold is secured.

Figure 2 shows a side view of a portion of the internal combustion engine opposite that seen in Figure 1, with portions of the water manifold broken away to better illustrate the invention.

Figure 3 is a sectional view substantially on the line 3—3 of Figure 2 showing the water manifold in longitudinal section.

Figure 4 is a section taken substantially on the line 4—4 of Figure 3.

Figure 5 is a transverse sectional view of the manifold per se with parts being shown in separate relation.

Referring to Figure 1, the numeral 10 indicates an engine block having a crankcase 12, and an oil pan 14. Interrelated with the engine is the usual radiator 16 having the upper tank 18 and the lower tank 20.

The crankshaft extends outside the engine block, and is provided on the end thereof with a pulley 22, which is connected to a second pulley 24 by means of the usual V-shaped belt 26. Rigid with the pulley 24 is the fan shaft 28, which operates the fan 30, and also the water pump 32. The water pump 32 is positioned within a housing 34 formed in the front end of the engine block 10.

The cylinders of the engine are indicated at 36 and in these cylinders are operated the usual pistons 38 connected to the crankshaft by means of the piston rods 40. Between the various cylinders 36 there are provided spaces 42, 44, 46, 48, and 50, and between the end cylinders and end of the engine block there are provided the additional spaces 52 and 54, all of which spaces allow for the circulation of the water delivered by the pump 32 to the cooling system. By referring to Figure 1, it will be noted that the spaces 44 and 48 are considerably larger than the spaces 42, 46 and 50.

In the engine shown in the drawings each two adjacent cylinders accordingly forming three pairs. The water spaces 44 and 48 between the pairs is larger than the spaces 42, 46 and 50 between the individual cylinders of a pair. This construction will require a larger amount of cooling water in the larger spaces.

At the side 56 of the engine block over an opening 58 there is provided the water manifold 60 of the invention. This water manifold is rigidly secured to the block in liquid tight relation and comprises the inner member 62 and the outer member 64. Both these members are U-shaped in transverse cross section as is seen in Figures 4 and 5. The inner member 62 has the leg portions 66 and 68 which have the flanges 70 and 72. The outer member 64 has the leg portions 74 and 76 which are provided with the side flanges 78 and 80. The flanges 78 and 80 continue around the ends of the outer member 64 so that this member has a flange extending entirely around its edge. The flanges 78 and 80 are provided with a rabbet or seat 82 in which there are adapted to fit the flanges 70 and 72 of the inner member 62 of the manifold 60. After the flanges of the inner member are seated in the rabbet 82, the parts are secured together in any suitable way, such as by spot welding or soldering, so as to form a rigid construction.

The flanges 78 and 80 it will be noted extend considerably beyond the flanges 70 and 72. These flanges 78 and 80 are provided with a plurality of openings for the reception screws 84 which hold the manifold onto the engine block.

From an inspection of Figure 2, it will be noted that the left hand or pump end 86 of the inner member extends short of the end of the engine block and is also shorter than the outer member 64. This will provide for an inlet opening 87 in the end of the manifold 60. This opening conforms with an opening 88 in the end of the engine block, which opening leads to the pump housing 34.

Intermediate the length of the inner member 62 there is provided a plurality of projections 90, 92 and 94, having open ends 96, 98 and 100, which openings are for the purpose of delivering the cooling water between the cylinders. By referring to Figure 3, it will be noted that the openings 96 and 100, delivering water to the spaces 44 and 48, are considerably larger than the opening 98, which delivers water to the space 46. The purpose of this difference in the size of the openings is to deliver a larger amount of cooling liquid to the spaces 44 and 48, which are considerably larger than the space 46 between the central pair of cylinders.

While in practice the openings 96, 98 and 100 might be provided in the flat inner surface of the inner member 62 of the jacket 60, I have found that by providing the projections 90, 92 and 94, a better and more efficient degree of cooling of the engine obtained. In actual practice, with the arrangement of cylinders as shown, I prefer to make the diameter of the openings 96 and 100 substantially twice the size of the diameter of the opening 98, although this difference in diameters will vary according to the amount of water which it is desired to deliver to the spaces between the engine cylinders. The distance the projection 90, 92 and 94 extend away from the inner member 62 will also vary with different types of engines and arrangements of cylinders. With the arrangement shown the distance will be substantially one-half an inch.

The end of the inner member 62 of the jacket 60 opposite the pump 32 extends short of the end of the outer member 64. This will provide for a rather larger opening 102 at the end of the engine block farthest away from the pump. If this opening is unrestricted, it will permit too large a volume of water to be delivered to the end cylinders and thereby cause an unequal cooling. To overcome this difficulty, I provide a baffle or restriction in the channel of the manifold, which baffle is in the form of an angle plate 103, one angle 104 of which extends across the passageway while the second angle 106 is secured in any suitable way to the end portion of the inner member 62. This baffle extending out across the passageway will form a restriction and impede or prevent the free flow of water from the opening 102 to the cylinder 36. If desired the baffle may be formed by bending inwardly of the passageway or channel an integral extension of the base or leg of the inner member.

By referring to Figure 4, it will be noted that the water entering the various chambers 42 to 54, inclusive, will pass through openings such as 108 into the head portion 110, from where the water flows to the outlet 112 and into the pipe 114, to the upper tank 18 of the radiator. A pipe 116 conducts the water from the lower tank of the radiator to the pump 32.

By referring to Figure 3, it will be seen that the pump housing is provided with openings 118 and 120 to allow for a portion of the water to flow to the first cylinder 36 to thereby effect a cooling thereof. The pump chamber is further provided with an opening 122 (see Fig. 1) for delivering a portion of the cooling water to the end opening 108 in the head 110.

The operation of the cooling system is as follows: The pump 32 will draw the water through the pipe 116 from the lower tank 20 of the radiator and force it into the pump housing 34, from where the water will divide, a portion flowing from the openings 118 and 120 to cool the first cylinder 36, a second portion flowing toward the opening 122 to cool the end portion of the head 110, while the relatively larger portion or the bulk of water will pass from the opening 88 into the end 86 of the manifold 60. The pump will force the water along the manifold 60 and as it reaches the openings 96, and 98, 100 and 102, it will flow between the various cylinders so as to effect a substantial equal cooling of the metal parts. From the spaces between the cylinders, the cooling liquid will flow out at the openings 108 into the head 110, and from the head to the upper tank 18 of the radiator through the opening 112 and the pipe 114.

I claim:

1. In a water cooling system for internal combustion engines, a removable water manifold comprising a plurality of parts and adapted to be secured to the engine block, means intermediate the length of said manifold to allow for the flow of water between the cylinders, and means at the end of the manifold to allow for the flow of water to the cylinders.

2. In a water cooling system for internal combustion engines, in combination with an engine block having a housing at one end and an opening at one side, a pump in said housing to cause the flow of water in the system, a hollow manifold secured at the opening, a passage affording communication between the pump chamber and the manifold, passages in the pump chamber to allow the flow of water to the cylinders adjacent the pump and means at the manifold to distribute the water among the cylinders.

3. The combination of claim 2, said means comprising a plurality of open ended projections intermediate the length of said manifold, and an opening at the end of the manifold opposite the pump, and a baffle in said manifold at said end opening to restrict the flow of water.

4. In a water cooling system for internal combustion engines, a removable water manifold comprising a plurality of parts and adapted to be secured to the engine block, means intermediate the length of said manifold to allow for the flow of water between the cylinders, means at the end of the manifold to allow for the flow of water to the cylinders, and a baffle at said last named means to restrict the flow of water.

5. In a water cooling system for internal combustion engines, a removable water manifold comprising a plurality of parts and adapted to be secured to the engine block, means intermediate the length of said manifold to allow for the flow of water between the cylinders, means at the end of the manifold to allow for the flow of water to the cylinders, and a plate extending across the path of said manifold and positioned at said end opening to restrict the flow of water through the manifold.

6. In a water cooling system for internal combustion engines, a removable water manifold comprising a plurality of parts and adapted to be secured to the engine block, means intermediate the length of said manifold to allow for the flow of water between the cylinders, means at the end of the manifold to allow for the flow of water to the cylinders, and an angle iron secured to and extending across the manifold to form a restriction to impede the flow of water at the manifold end.

7. In a water cooling system for internal combustion engines, a removable water manifold comprising a plurality of parts and adapted to be secured to the engine block, one of said plurality of parts extending short of the other part to form a water exit opening at the manifold end, means intermediate the length of said manifold to allow for the flow of water between the cylinders, and means at the end of the manifold to allow for the flow of water to the manifold.

8. In a water cooling system for internal combustion engines, a water manifold adapted to be secured to the engine block comprising two members rigidly secured together, U-shaped in cross section, and having the bases of the U extending away from each other so as to form a channel therebetween, one of said members having a baffle to act as a restriction to impede the flow of water.

9. In a water cooling system for internal combustion engines, a removable water manifold adapted to be secured to the engine block, and a plurality of projections on said manifold having open ends for permitting the water to flow between the engine cylinders.

10. In a water cooling system for internal combustion engines, a removable water manifold adapted to be secured to the engine block, and a plurality of projections on said manifold having open ends of different size for permitting the water to flow between the engine cylinders.

11. In a water cooling system for internal combustion engines, a removable water manifold adapted to be secured to the engine block, said manifold comprising a plurality of parts rigidly secured together, and means on said manifold to cause the water to flow between the engine cylinders.

12. In a water cooling system for internal combustion engines, a removable water manifold adapted to be secured to the engine block, said manifold comprising a plurality of parts rigidly secured together, and means on said manifold to cause the water to flow between the engine cylinders, said means formed on the manifold part adjacent the engine block.

13. In a water cooling system for internal combustion engines, a removable water manifold adapted to be secured to the engine block, means on said manifold to cause the water to flow between the engine cylinders, and a baffle in said manifold to divert the flow of water.

14. In a water cooling system for internal combustion engines, a removable water manifold adapted to be secured to the engine block, and means on said manifold comprising a plurality of openings intermediate the length of the manifold and an end opening for causing the water to flow about the engine cylinders.

15. In a water cooling system for internal combustion engines, a removable water manifold adapted to be secured to the engine block, and means on said manifold comprising a plurality of projections having open ends positioned intermediate the length of said manifold and an end opening for causing the water to flow about the engine cylinders.

16. In a water cooling system for internal combustion engines, a water manifold adapted to be secured to the engine block comprising two members rigidly secured together, U-shaped in cross section, and having the bases of the U extending away from each other so as to form a channel therebetween, one of said members having a plurality of openings to allow for the passage of water to the cylinders.

17. In a water cooling system for internal combustion engines, a water manifold adapted to be secured to the engine block comprising two members rigidly secured together, U-shaped in cross section, having the bases of the U extending away from each other so as to form a channel therebetween, one of said members extending short of the other member at both ends so as to form water inlet and outlet openings, and means for delivering water from the manifold to the cylinders.

18. In a water cooling system for internal combustion engines, a water manifold adapted to be secured to the engine block comprising two members rigidly secured together, U-shaped in cross section, and having the bases of the U extending away from each other so as to form a channel therebetween, and a plurality of open ended extensions on one of said members to permit the flow of water to the cylinders from the manifold.

19. In combination with an internal combustion engine having an engine block and a water circulating system, a head portion on said block, an open wall portion on said engine block, a water manifold secured in fluid tight relation over said wall portion, and means to distribute water from said manifold to the engine.

20. In a water manifold, a plurality of mating portions forming a channel between them, one of said portions having a plurality of spaced different size water delivery openings to distribute the water.

21. In a water manifold, a plurality of mating portions forming a channel between them, one of said portions extending short of the manifold to form an inlet opening at one end and an outlet opening at the other end, and means on one of said portions to distribute water.

22. In a water manifold, a plurality of mating portions forming a channel between them, one of said portions extending short of the manifold to form an inlet opening at one end and an outlet opening at the other end, one of said portions having a plurality of spaced different sized water delivery openings to distribute the water.

23. In a water manifold, a plurality of mating portions forming a channel between them, one of said portions extending short of the manifold to form an inlet opening at one end and a outlet opening at the other end, and a plurality of projections having openings of different size on one of said portions to distribute water.

In testimony whereof I affix my signature.

CHARLES L. McCUEN.